US011239627B2

(12) United States Patent
Yan et al.

(10) Patent No.: US 11,239,627 B2
(45) Date of Patent: Feb. 1, 2022

(54) WAVEGUIDE INTEGRATED OPTICAL MODULATOR, PULSED OPTICAL FREQUENCY COMB AND MODE-LOCKED FIBER LASER

(71) Applicant: SHENZHEN UNIVERSITY, Shenzhen (CN)

(72) Inventors: Peiguang Yan, Shenzhen (CN); Hao Chen, Shenzhen (CN); Jinde Yin, Shenzhen (CN); Fengfei Xing, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 81 days.

(21) Appl. No.: 16/579,800

(22) Filed: Sep. 23, 2019

(65) Prior Publication Data

US 2020/0106238 A1    Apr. 2, 2020

Related U.S. Application Data

(63) Continuation of application No. PCT/CN2018/109015, filed on Sep. 30, 2018.

(51) Int. Cl.
*H01S 3/11* (2006.01)
*H01S 3/067* (2006.01)
(Continued)

(52) U.S. Cl.
CPC ........ *H01S 3/1118* (2013.01); *H01S 3/06791* (2013.01); *H01S 3/08013* (2013.01);
(Continued)

(58) Field of Classification Search
CPC ............... H01S 3/1118; H01S 3/06791; H01S 3/08013; H01S 3/094003; H01S 3/09415; H01S 3/10061
See application file for complete search history.

(56) References Cited

U.S. PATENT DOCUMENTS 6,571,028 B1 *  5/2003  LoCascio ............... B82Y 10/00
                                                            359/244
2007/0003202 A1   1/2007  Iio et al.
2010/0002994 A1 * 1/2010  Baehr-Jones ........ G02B 6/1223
                                                            385/32

FOREIGN PATENT DOCUMENTS

CN    106911070 A  *  6/2017  ............... H01S 3/11
CN    107706731 A     2/2018
            (Continued)

OTHER PUBLICATIONS

Machine Translation of CN106911070A (Year: 2017).*

*Primary Examiner* — Yuanda Zhang

(57) ABSTRACT

The present disclosure provides a waveguide integrated optical modulator, which is made of a bismuth film, an antimony film, or a tellurium film. A thickness of the bismuth film, the antimony film, or the tellurium film is between 10 nm and 200 nm, and the bismuth film, the antimony film, or the tellurium film is produced by physical vapor deposition method. The waveguide integrated optical modulator can directly add the symmetrical electrode on the surface of the bismuth film, the antimony film, or the tellurium film, and apply an external bias voltage of different amplitudes to the bismuth film, the antimony film, or the tellurium film by adjusting the power source. Thus, the waveguide integrated optical modulator can actively control the nonlinear optical characteristics of the saturable absorber by changing the magnitude of the external voltage, and further actively modulate the laser characteristics of the pulse.

14 Claims, 3 Drawing Sheets

(51) Int. Cl.
    *H01S 3/094*      (2006.01)
    *H01S 3/08*       (2006.01)
    *H01S 3/10*       (2006.01)
    *H01S 3/0941*     (2006.01)

(52) U.S. Cl.
    CPC .... *H01S 3/09415* (2013.01); *H01S 3/094003* (2013.01); *H01S 3/10061* (2013.01)

(56) References Cited

FOREIGN PATENT DOCUMENTS

| | | |
|---|---|---|
| CN | 107809053 A | 3/2018 |
| CN | 108123360 A | 6/2018 |
| JP | H8-6079 A | 1/1996 |
| WO | PCT/CN2018/109015 | 9/2018 |

* cited by examiner

WAVEGUIDE INTEGRATED OPTICAL MODULATOR, PULSED OPTICAL FREQUENCY COMB AND MODE-LOCKED FIBER LASER

CROSS REFERENCE TO RELATED APPLICATIONS

This non-provisional patent application is a continuation application of an international application No. PCT/CN2018/109015 filed on Sep. 30, 2018. The application(s) is incorporated herein by reference.

TECHNICAL FIELD

The present disclosure relates to the field of laser technology, and in particular to a waveguide integrated optical modulator, a pulsed optical frequency comb and a mode-locked fiber laser.

BACKGROUND

The use of passive mode-locked technology is an effective way to achieve ultrafast pulse output of ultrafast lasers. The key technology of passive mode-locked is that a light modulator with saturable absorption effect is needed in a resonant cavity of the ultrafast lasers. Researchers usually use a semiconductor saturable absorber mirror (SESAM) to achieve a mode-locked ultrafast pulse output of a fiber laser. However, commercial SESAM is expensive, complicated in manufacturing process, and narrow in saturable absorption bandwidth. In addition, the commercial SESAM generally supports only picosecond pulse output, and has a low damage threshold. Thus, the commercial SESAM cannot apply to completely study dynamic characteristics of the ultrafast lasers. In general, the commercial SESAM has specific saturable absorption characteristics, and modulation depth, saturable absorption bandwidth, and saturation light intensity of the commercial SESAM have a fixed working value. Thus, the above-mentioned parameters of the commercial SESAM cannot be adjusted by external variables, and the application of the commercial SESAM at different operating wavelengths is limited.

Therefore, the development of the light modulator with low cost, simple process, high performance and tunable saturation absorption characteristics has been the goal pursued in the field of ultrafast laser physics. The present disclosure provides an integrated light modulator produced on an optical waveguide by using a metalloid material having semiconductor characteristics and a thin film growth techniques, and the metalloid material is bismuth, antimony, or tellurium, the technology of producing the integrated light modulator is not reported in the prior art.

SUMMARY

The present disclosure provides a waveguide integrated optical modulator, a producing method thereof, and a mode-locked fiber laser, which resolve the technical problems that the commercial SESAM used in the prior art is expensive and is complicated in producing process. The present disclosure may change an external voltage to actively control performance parameters of a saturable absorber, and further changes output characteristics of a mode-locked pulse.

The objective of the present disclosure is achieved by the following technical solutions:

A waveguide integrated optical modulator includes an optical waveguide comprising an electrode and a saturable absorber covered on the optical waveguide, the saturable absorber is made of a bismuth film, an antimony film, or a tellurium film.

Preferably, the waveguide integrated optical modulator further comprises a wire and an external power source electrically connected to the electrode via the wire; the optical waveguide further comprises a pin, and the optical waveguide is electrically connected to the external power source via the wire to make nonlinear optical characteristics of the saturable absorber be electrically controlled.

Preferably, the external power source is an adjustable direct current power supply or an adjustable radio frequency power supply, and the nonlinear optical characteristics of the saturable absorber can be electrically controlled by an external bias voltage.

Preferably, the optical waveguide is a side-polished fiber, a silicon-based optical waveguide, or a chalcogenide glass optical waveguide.

Preferably, a thickness of the bismuth film, the antimony film, or the tellurium film is between 10 nm and 200 nm.

Preferably, the bismuth film, the antimony film, or the tellurium film is produced by physical vapor deposition method, and a crystalline state of the bismuth film, the antimony film, or the tellurium film is capable of controlling a deposition rate, and temperature and time of annealing.

Preferably, the saturable absorber further comprises a package protection layer, and the package protection layer is covered on the bismuth film, the antimony film, or the tellurium film; the bismuth film, the antimony film, or the tellurium film forms a saturable absorption layer.

Preferably, the package protection layer is made of a magnesium fluoride film, and the magnesium fluoride film is capable of isolating an external environment from the saturable absorption layer.

A method for producing the above-mentioned waveguide integrated optical modulator includes:

Preparing two symmetrical electrodes on an optical waveguide;

Making a bismuth film, an antimony film, or a tellurium film directly grow on a predetermined location of the optical waveguide by a mask and a physical vapor deposition method to form a saturable absorption layer;

Adding a package protection layer on the saturable absorption layer by a physical deposition method; and Soldering a pin of a wire to the electrode, and electrically connecting an adjustable direct current power supply to the pin through the wire.

Preferably, a method for preparing two symmetrical electrodes on the optical waveguide includes: preparing the optical waveguide and gold target material in a vacuum chamber, placing the mask onto the optical waveguide, ionizing a surface of the gold target material to generate a gold plasma, and depositing the gold plasma on the optical waveguide to form a gold film layer; a location where the gold film is deposited to the optical waveguide is controlled by the mask, and a desired thickness of the gold film is achieved by controlling deposition time of the gold plasma.

A pulsed fiber laser includes a semiconductor pump laser, an optical wavelength division multiplexer, a gain fiber, an optical coupler, an optical isolator, a polarization controller, and the above-mentioned waveguide integrated optical modulator. The semiconductor pump laser, the optical wavelength division multiplexer, the gain fiber, the optical coupler, the optical isolator, the polarization controller, and the waveguide integrated optical modulator are connected in turn to form an annular cavity. The optical isolator is configured to isolate a laser after mode-locking, and only allows the laser after the mode-locking to be unidirectionally outputted in the pulsed fiber laser. After a pump light generated by the semiconductor pump laser is coupled by the optical wavelength division multiplexer, the pump light is sent to the gain fiber, which can provide a gain to a laser pulse and amplify the laser pulse. The optical coupler sends a portion of the amplified laser pulse to an outside of the annular cavity of the pulsed fiber laser; and sends another portion of the amplified laser pulse to the waveguide integrated optical modulator, and the another portion of the amplified laser pulse is mode-locked via the saturable absorber in the waveguide integrated optical modulator. The polarization controller is configured to control a polarization state of the laser in the pulsed fiber laser. The waveguide integrated optical modulator modulates a carrier density in the saturable absorber and changes an ability of the carrier to modulate light by changing direct current bias signal applied to the saturable absorber. The waveguide integrated optical modulator is capable of changing a radio frequency electrical signal applied to the saturable absorber by external drive, and immediately control the carrier density in the saturable absorber to actively modulate the pulse laser in the annular cavity.

Preferably, the waveguide integrated optical modulator further comprises a wire and an external power source electrically connected to the electrode via the wire; the optical waveguide further comprises a pin, and the optical waveguide is electrically connected to the external power source via the wire to make nonlinear optical characteristics of the saturable absorber be electrically controlled.

Preferably, the external power source is an adjustable direct current power supply or an adjustable radio frequency power supply, and the nonlinear optical characteristics of the saturable absorber can be electrically controlled by an external bias voltage.

A method for producing a pulsed optical frequency comb, includes:

Adding the above-mentioned waveguide integrated optical modulator into an optical micro-cavity.

Preferably, the optical micro-cavity includes an optical micro-ring configured to provide optical resonance for generating the pulsed optical frequency comb and a coupled optical waveguide. One end of the coupled optical waveguide is configured to couple a pump light into the optical micro-ring, and the other end of the coupled optical waveguide is configured to output a signal light from the optical micro-ring. The optical micro-ring comprises a micro-ring active region and the waveguide integrated optical modulator; the micro-ring active region is configured to generate a gain; when the pump light is sent to the micro-ring active region, the pump light generates an amplified spontaneous emission spectrum and further amplifies the generated laser. The waveguide integrated optical modulator is configured to modulate the pulsed optical frequency comb and make the pulsed optical frequency comb form a mode-locked pulse laser by controlling saturable absorption characteristics of the bismuth film, the antimony film, or the tellurium film.

Preferably, the waveguide integrated optical modulator further comprises a wire and an external power source electrically connected to the electrode via the wire; the optical waveguide further comprises a pin, and the optical waveguide is electrically connected to the external power source via the wire to make nonlinear optical characteristics of the saturable absorber be electrically controlled.

Preferably, the waveguide integrated optical modulator is capable of actively controlling the saturable absorption characteristics of the bismuth film, the antimony film, or the tellurium film by applying an external voltage to control a pulse laser formed by the pulsed optical frequency comb.

Compared with the prior art, the waveguide integrated optical modulator of the present disclosure has the beneficial effects which are as follows: the saturable absorber made of the bismuth film, the antimony film, or the tellurium film may be controlled by the external power source, which enable the nonlinear optical characteristics of the saturable absorber to be optimized, and further actively regulate the light pulse.

The method for producing the waveguide integrated optical modulator provided by the present disclosure is simple. The bismuth, the antimony, and the tellurium with the saturable absorption characteristics are used, and the material cost is low. From the characteristics, the bismuth, the antimony, and the tellurium are metal-like elements and have semiconductor characteristics, and the forbidden band width can be regulated by the thicknesses of the crystal film. The physical vapor deposition method is convenient for batch preparation of high-crystalline bismuth film, the antimony film, and the tellurium film, so the method has potential industrialization prospects. Furthermore, the waveguide integrated optical modulator provided by the present disclosure has an important application prospect in the realization of the ultrafast pulsed laser in the field of the ultrafast lasers and in the field of silicon-based photonic integration.

DETAILED DESCRIPTION OF THE PREFERRED EMBODIMENTS

In order to make the objects, technical solutions and advantages of the present disclosure more clear, the present disclosure will be described in greater detail with reference to the combination of the embodiments and the drawings. It should be noted that the embodiments described herein are merely illustrative of the present disclosure and do not limit the scope of the present disclosure.

Figure 1A:
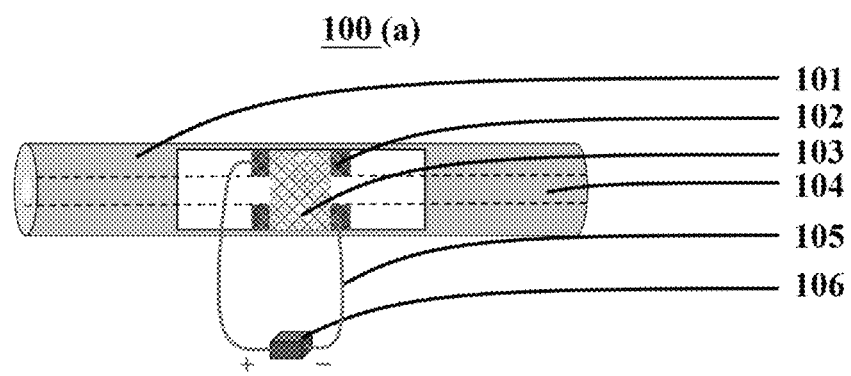
FIG. 1a is a schematic structural view of a side-polished fiber waveguide integrated optical modulator according to a first embodiment of the present disclosure.

A first embodiment of the present disclosure provides two waveguide integrated optical modulators, one waveguide integrated optical modulator is a side-polished fiber waveguide integrated optical modulator, and another waveguide integrated optical modulator is a silicon-based waveguide integrated optical modulator. As shown in FIG. 1a, the first embodiment of the present disclosure provides the side-polished fiber waveguide integrated optical modulator 100 (*a*), which includes an optical waveguide 101, a gold film electrode 102, a saturable absorber film 103, a fiber core 104, a wire 105, and an external source 106. The external power source 106 may be an adjustable direct-current (DC) power supply or a radio frequency (RF) power supply.

Figure 1B:
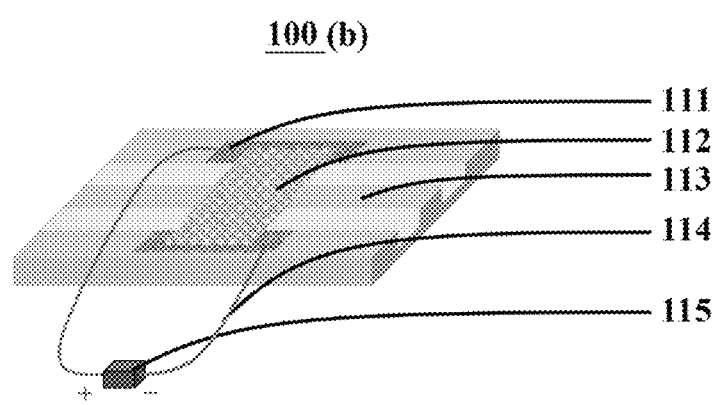
FIG. 1b is a schematic structural view of a silicon-based waveguide integrated optical modulator according to the first embodiment of the present disclosure.

As shown in FIG. 1b, the embodiment of the present disclosure provides the silicon-based waveguide integrated optical modulator 100(b), which includes a gold film electrode 111, a saturable absorber film 112, an optical waveguide 113, a wire 114, and an external power source 115.

The gold film electrode 111 and the external power source 115 are used to apply an external bias voltage to two ends of the saturable absorber film 112, which can actively control nonlinear optical characteristics of the saturable absorber film 112.

The optical waveguide 113 is used to transmit incident light and makes light field interact with the saturable absorber film 112 by an evanescent field at a location covered by the saturable absorber film 112.

The waveguide integrated optical modulators provided by the first embodiment of the present disclosure have high reliability, tunable optical band gap of the saturable absorber, high environmental compatibility, wide application range, low cost of each material used, and easy batch preparation. The waveguide integrated optical modulators are suitable for the achievement transformation and have broad application prospects.

Specifically, the saturable absorber film is formed of a bismuth film, an antimony film, or a tellurium film. The bismuth film, the antimony film, or the tellurium film has a high crystalline state, and great thickness is between 10 nm and 200 nm. When the thickness of the bismuth film, the antimony film, or the tellurium film is in the thickness range of an atomic layer, a forbidden band width is different from a block thickness, and corresponding in-band relaxation time, carrier concentration, and mobility are different. Thus, changing the thickness of the saturable absorber film can change the characteristics of the saturable absorber. In addition, the external voltage is applied by using a DC bias or radio frequency signals, which can actively control the optical band gap of the saturable absorber film formed of the bismuth film, the antimony film, or the tellurium film, and modulate the carrier concentration of the junction region. Thus, the nonlinear optical characteristics of the waveguide integrated optical modulator can be regulated, such as modulation depth, saturable absorption bandwidth, saturation light intensity, and so on.

Specifically, the saturable absorber formed of the bismuth film, the antimony film, or the tellurium film further includes a package protection layer, and the package protection layer is a magnesium fluoride film covering the saturable absorption layer, and is applied to isolate an influence of an external environment on the saturable absorption layer.

Figure 2:
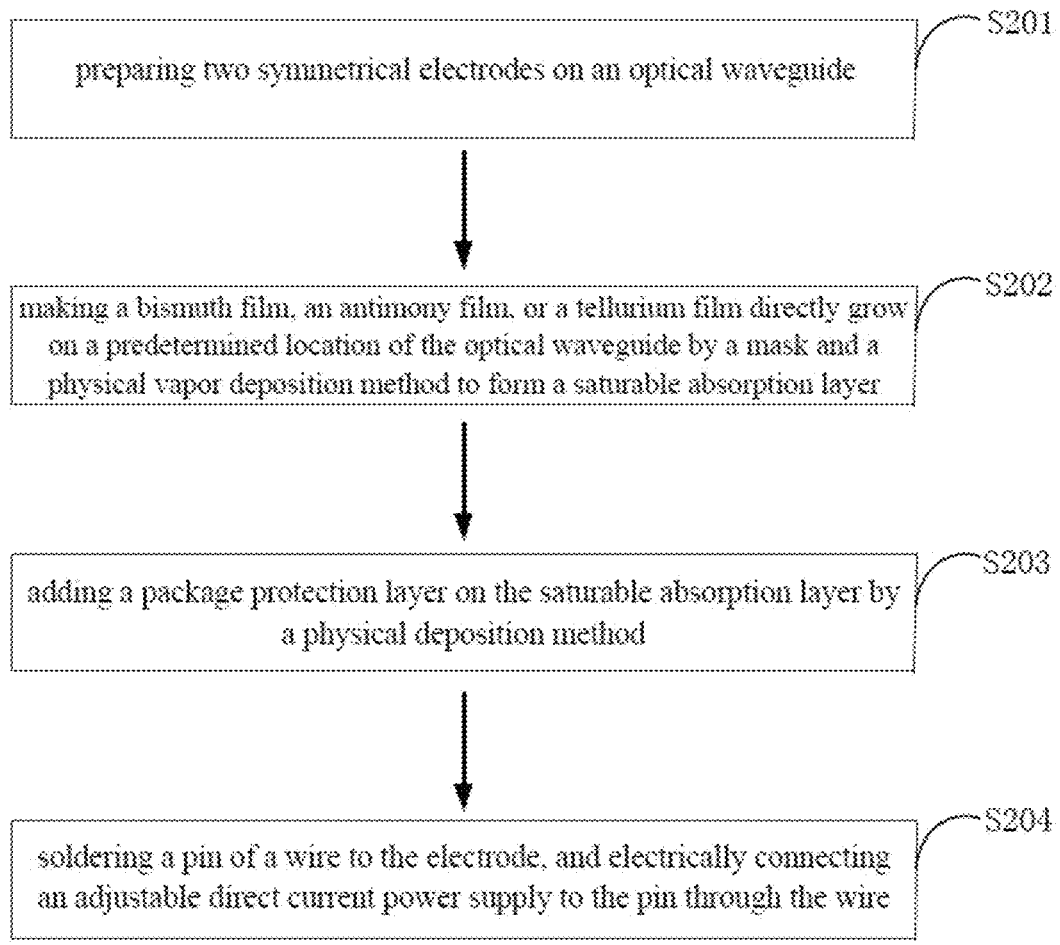
FIG. 2 is a diagram of a method for producing a waveguide integrated optical modulator according to a second embodiment of the present disclosure.

A second embodiment of the present disclosure provides a method for producing the above-mentioned waveguide integrated optical modulator, as shown in FIG. 2, the steps are as follows:

S201: preparing two symmetrical electrodes on the optical waveguide; the steps are as follows: preparing the optical waveguide and gold target material in a vacuum chamber, and placing a mask onto the optical waveguide; ionizing a surface of the gold target material to generate a gold plasma, and depositing the gold plasma on the optical waveguide to form a gold film layer; a location where the gold film is deposited to the optical waveguide is controlled by the mask, and a desired thickness of the gold film is achieved by controlling deposition time of the gold plasma;

S202: making the bismuth film, the antimony film, or the tellurium film directly grow on a predetermined location of the optical waveguide by the mask and a physical vapor deposition method to form the saturable absorption layer;

S203: adding the package protection layer on the saturable absorption layer by a physical deposition method; the package protection layer is made of magnesium fluoride, and the magnesium fluoride film can isolate the influence of the external environment on the saturable absorption layer;

S204: soldering a pin of the wire to the electrode, and electrically connecting the adjustable DC power supply or the RF power supply to the pin through the wire.

Figure 3:
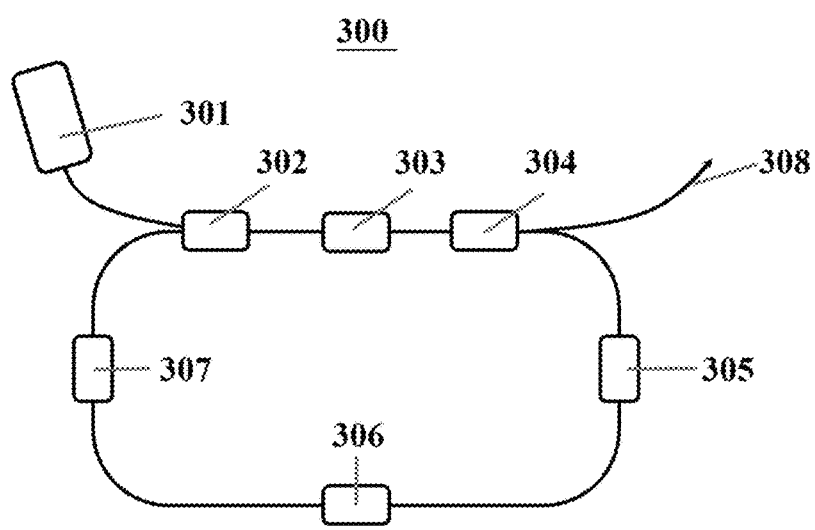
FIG. 3 is a schematic structural view of a pulsed fiber laser according to a third embodiment of the present disclosure.

Referring to FIG. 3, a third embodiment of the present disclosure provides a pulsed fiber laser 300. The pulsed fiber 300 includes a semiconductor pump laser 301, an optical wavelength division multiplexer 302, a gain fiber 303, an optical coupler 304, an optical isolator 305, a polarization controller 306, the waveguide integrated optical modulator 307, and the coupler output terminal 308, which are connected in turn to form an annular cavity.

The optical isolator 305 is configured to isolate the laser after the mode-locking, and only allows the laser after the mode-locking to be unidirectionally outputted in the pulsed fiber laser.

After a pump light generated by the semiconductor pump laser 301 is coupled by the optical wavelength division multiplexer 302, the pump light is sent to the gain fiber 303, which can provide a gain to the laser pulse and amplify the laser pulse.

The optical coupler 304 sends a portion of the amplified laser pulse to an outside of the annular cavity of the pulsed fiber laser; and sends another portion of the amplified laser pulse to the waveguide integrated optical modulator 307, and the another portion of the amplified laser pulse is mode-locked via the saturable absorber in the waveguide integrated optical modulator 307.

The polarization controller 306 is configured to control a polarization state of a laser in the pulsed fiber laser.

The waveguide integrated optical modulator 307 modulates the carrier density in the saturable absorber and changes the ability of the carrier to modulate light by changing the external power source applied to the saturable absorber and using the DC bias signal.

The waveguide integrated optical modulator 307 can change the external power source applied to the saturable absorber by external drive, and immediately control the carrier density in the saturable absorber by the radio frequency electrical signal, thereby actively modulating the pulse laser in the annular cavity.

The coupler output terminal 308 is configured to output the laser in the annular cavity out of the annular cavity.

Figure 4:
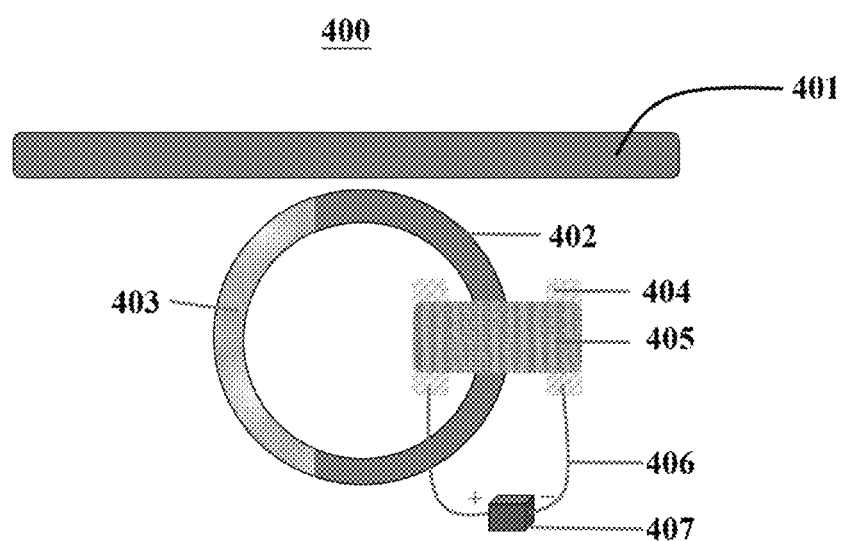
FIG. 4 is a schematic structural view of a pulsed optical frequency comb according to a fourth embodiment of the present disclosure.

Referring to FIG. 4, a fourth embodiment of the present disclosure provides a method for generating a pulsed optical frequency comb, and the waveguide integrated optical modulator is incorporated into an optical micro-cavity. The optical micro-cavity 400 includes a coupled optical waveguide 401, an optical micro-ring 402, a micro-ring active region 403, a gold film electrode 404, a saturable absorption material 405, a wire 406, and an external power source 407. One end of the coupled optical waveguide 401 is configured to couple the pump light into the optical micro-ring 402, and the other end of the coupled optical waveguide 401 is configured to output a signal light from the optical micro-ring 402.

The micro-ring active region 403 and the waveguide integrated optical modulator are integrated in the optical micro-ring 402.

The micro-ring active region 403 is configured to generate the gain. When the pump light is sent to the micro-ring active region, the pump light can generate an amplified spontaneous emission spectrum and further amplify the generated laser.

The optical micro-ring 402 is configured to provide optical resonance to generate the pulsed optical frequency comb.

The waveguide integrated optical modulator includes the gold film electrode 404, the saturable absorption material 405, the wire 406, and the external power source 407. The gold film electrode 404, the wire 406, and the external power source 407 apply an external bias voltage to the saturable absorption material 405. The pulsed optical frequency comb can be modulated by modulating the waveguide integrated optical modulator. The pulsed optical frequency comb forms a mode-locked pulse laser by controlling the saturable absorption characteristics of the bismuth film, the antimony film, or the tellurium film. The saturable absorption characteristics of the bismuth film, the antimony film, or the tellurium film can be actively controlled by applying the external voltage, thereby further controlling the pulse laser formed by the pulsed optical frequency comb.

The above embodiments are only the preferred embodiments of the present disclosure, and do not limit the scope of the present disclosure. A person skilled in the art may make various other corresponding changes and deformations based on the described technical solutions and concepts. And all such changes and deformations shall also fall within the scope of the present disclosure.

What is claimed is:

1. A waveguide integrated optical modulator, comprising: an optical waveguide comprising an electrode; and a saturable absorber covered on the optical waveguide; wherein the saturable absorber is made of a bismuth film, an antimony film, or a tellurium film; a thickness of the bismuth film, the antimony film, or the tellurium film is between 10 nm and 200 nm; the bismuth film, the antimony film, or the tellurium film is produced by physical vapor deposition method, and a crystalline state of the bismuth film, the antimony film, or the tellurium film is capable of controlling a deposition rate, and temperature and time of annealing.

2. The waveguide integrated optical modulator of claim 1, wherein the waveguide integrated optical modulator further comprises a wire and an external power source electrically connected to the electrode via the wire; the optical waveguide is electrically connected to the external power source via the wire to make nonlinear optical characteristics of the saturable absorber be electrically controlled.

3. The waveguide integrated optical modulator of claim 2, wherein the external power source is an adjustable direct current power supply or an adjustable radio frequency power supply, and the nonlinear optical characteristics of the saturable absorber can be electrically controlled by an external bias voltage.

4. The waveguide integrated optical modulator of claim 2, wherein the optical waveguide is a side-polished fiber, a silicon-based optical waveguide, or a chalcogenide glass optical waveguide.

5. The waveguide integrated optical modulator of claim 1, wherein the saturable absorber further comprises a package protection layer, and the package protection layer is covered on the bismuth film, the antimony film, or the tellurium film; the bismuth film, the antimony film, or the tellurium film forms a saturable absorption layer.

6. The waveguide integrated optical modulator of claim 5, wherein the package protection layer is made of a magnesium fluoride film, and the magnesium fluoride film is capable of isolating an external environment from the saturable absorption layer.

7. The waveguide integrated optical modulator of claim 1, wherein the waveguide integrated optical modulator is added into an optical micro-cavity;
wherein the optical micro-cavity comprises an optical micro-ring configured to provide optical resonance for producing a pulsed optical frequency comb and a coupled optical waveguide;
one end of the coupled optical waveguide is configured to couple a pump light into the optical micro-ring, and the other end of the coupled optical waveguide is configured to output a signal light from the optical micro-ring;
the optical micro-ring comprises a micro-ring active region and the waveguide integrated optical modulator; the micro-ring active region is configured to generate a gain; when the pump light is sent to the micro-ring active region, the pump light generates an amplified spontaneous emission spectrum and further amplifies the generated laser;
the waveguide integrated optical modulator is configured to modulate the pulsed optical frequency comb and make the pulsed optical frequency comb form a mode-locked pulse laser by controlling saturable absorption characteristics of the bismuth film, the antimony film, or the tellurium film.

8. The waveguide integrated optical modulator of claim 7, wherein the waveguide integrated optical modulator further comprises a wire and an external power source electrically connected to the electrode via the wire; the optical waveguide is electrically connected to the external power source via the wire to make nonlinear optical characteristics of the saturable absorber be electrically controlled.

9. The waveguide integrated optical modulator of claim 8, wherein the waveguide integrated optical modulator is capable of actively controlling the saturable absorption characteristics of the bismuth film, the antimony film, or the tellurium film by applying an external voltage to control the mode-locked pulse laser formed by the pulsed optical frequency comb.

10. A method for producing a waveguide integrated optical modulator of claim 1, comprising:
preparing two symmetrical electrodes on an optical waveguide;
making the bismuth film, the antimony film, or the tellurium film directly grow on a predetermined location of the optical waveguide by a mask and a physical vapor deposition method to form a saturable absorption layer;
adding a package protection layer on the saturable absorption layer by a physical deposition method; and
soldering a pin of a wire to the electrode, and electrically connecting an adjustable direct current power supply to the pin through the wire.

11. The method for producing a waveguide integrated optical modulator of claim 10, wherein preparing two symmetrical electrodes on the optical waveguide comprises:
preparing the optical waveguide and gold target material in a vacuum chamber;
placing the mask onto the optical waveguide;
ionizing a surface of the gold target material to generate a gold plasma; and depositing the gold plasma on the optical waveguide to form a gold film layer;
wherein a location where the gold film is deposited to the optical waveguide is controlled by the mask, and a desired thickness of the gold film is achieved by controlling deposition time of the gold plasma.

12. A pulsed fiber laser, comprising:
a semiconductor pump laser;
an optical wavelength division multiplexer;
a gain fiber;
an optical coupler;
an optical isolator;
a polarization controller; and
a waveguide integrated optical modulator of claim 1;
wherein the semiconductor pump laser, the optical wavelength division multiplexer, the gain fiber, the optical coupler, the optical isolator, the polarization controller, and the waveguide integrated optical modulator are connected in turn to form an annular cavity;
the optical isolator is configured to isolate a laser after mode-locking, and only allows the laser after the mode-locking to be unidirectionally outputted in the pulsed fiber laser;
after a pump light generated by the semiconductor pump laser is coupled by the optical wavelength division multiplexer, the pump light is sent to the gain fiber, which is capable of providing a gain to a laser pulse and amplify the laser pulse;
the optical coupler sends a portion of the amplified laser pulse to an outside of the annular cavity of the pulsed fiber laser; and sends another portion of the amplified laser pulse to the waveguide integrated optical modulator, and the another portion of the amplified laser pulse is mode-locked via the saturable absorber in the waveguide integrated optical modulator;
the polarization controller is configured to control a polarization state of the laser in the pulsed fiber laser;
the waveguide integrated optical modulator modulates a carrier density in the saturable absorber and changes an ability of the carrier to modulate light by changing direct current bias signal applied to the saturable absorber;
the waveguide integrated optical modulator is capable of changing a radio frequency electrical signal applied to the saturable absorber by external drive, and immediately control the carrier density in the saturable absorber to actively modulate the pulse laser in the annular cavity.

13. The pulsed fiber laser of claim 12, wherein the waveguide integrated optical modulator further comprises a wire and an external power source electrically connected to the electrode via the wire; the optical waveguide is electrically connected to the external power source via the wire to make nonlinear optical characteristics of the saturable absorber be electrically controlled.

14. The pulsed fiber laser of claim 13, wherein the external power source is an adjustable direct current power supply or an adjustable radio frequency power supply, and the nonlinear optical characteristics of the saturable absorber can be electrically controlled by an external bias voltage.

* * * * *